United States Patent
Lee et al.

(10) Patent No.: US 9,378,860 B2
(45) Date of Patent: Jun. 28, 2016

(54) POLYVINYL COPOLYMER, DOPANT HAVING THE SAME, AND CONDUCTIVE POLYMER COMPOSITE HAVING THE DOPANT

(71) Applicant: Ajou University Industry-Academic Cooperation Foundation, Suwon-si (KR)

(72) Inventors: Suck Hyun Lee, Gwacheon-si (KR); O Pil Kwon, Suwon-si (KR); Tae Ja Kim, Siheung-si (KR)

(73) Assignee: Ajou University Industry-Academic Cooperation Foundation, Suwon-si (KR)

( * ) Notice: Subject to any disclaimer, the term of this patent is extended or adjusted under 35 U.S.C. 154(b) by 198 days.

(21) Appl. No.: 14/063,693

(22) Filed: Oct. 25, 2013

(65) Prior Publication Data
US 2014/0048746 A1    Feb. 20, 2014

Related U.S. Application Data

(63) Continuation of application No. PCT/KR2012/003115, filed on Apr. 23, 2012.

(30) Foreign Application Priority Data

Apr. 25, 2011  (KR) .................. 10-2011-0038577

(51) Int. Cl.
*H01B 1/12* (2006.01)
*C08F 216/06* (2006.01)
(Continued)

(52) U.S. Cl.
CPC ........ *H01B 1/128* (2013.01); *C08F 8/36* (2013.01); *C08F 216/06* (2013.01); *C08L 29/04* (2013.01);
(Continued)

(58) Field of Classification Search
CPC ........ H01B 1/124; H01B 1/125; H01B 1/127; H01B 1/128; C08F 216/06; C08F 8/36; C08L 101/12; C08L 29/04; C08L 35/06; C08G 2261/722; C08G 2261/1452
See application file for complete search history.

(56) References Cited

U.S. PATENT DOCUMENTS 3,598,779 A * 8/1971 Galin .................. C08F 8/00
                                                           524/173
3,870,841 A    3/1975 Makowski et al.
(Continued)

FOREIGN PATENT DOCUMENTS

EP    0 339 340 A2    11/1989
JP    2001-158806    6/2001
(Continued)

OTHER PUBLICATIONS

International Search Report issued in International App. No. PCT/KR2012/003115, mailed Nov. 20, 2012.

*Primary Examiner* — Mark Kopec
*Assistant Examiner* — Matthew R Diaz
(74) *Attorney, Agent, or Firm* — Greer, Burns & Crain, Ltd.

(57) ABSTRACT

The present disclosure relates to a polyvinyl copolymer in which one or more side-chain sulfonic acids are attached on the hydroxy group of polyvinyl alcohol or a polyvinyl phenol and a preparation method thereof, a dopant including the same, a conductive polymer composite including the dopant with a conductive polymer and a preparation method thereof, wherein the electrical conductivity, dispersibility, solubility, heat-resistance and environment-resistance of the conductive polymer composite can be enhanced by using the dopant including the copolymer.

18 Claims, 2 Drawing Sheets

(51) Int. Cl.
*C08L 35/06* (2006.01)
*C08L 29/04* (2006.01)
*C08F 8/36* (2006.01)
*C08L 33/00* (2006.01)
*C08L 101/12* (2006.01)

(52) U.S. Cl.
CPC ............... *C08L 33/00* (2013.01); *C08L 35/06* (2013.01); *C08L 101/12* (2013.01); *H01B 1/127* (2013.01); *C08G 2261/1452* (2013.01); *C08G 2261/722* (2013.01); *C08L 2203/20* (2013.01)

(56) References Cited

U.S. PATENT DOCUMENTS

| | | | |
|---|---|---|---|
| 4,458,052 A | 7/1984 | Schmitt | |
| 5,061,401 A * | 10/1991 | Wernet et al. | 252/500 |
| 5,427,715 A * | 6/1995 | Ohwa et al. | 252/500 |
| 5,482,655 A * | 1/1996 | Vogel et al. | 252/500 |
| 5,968,417 A | 10/1999 | Viswanathan | |
| 6,203,727 B1 * | 3/2001 | Babinec et al. | 252/500 |
| 6,254,996 B1 * | 7/2001 | Fukuda et al. | 428/480 |
| 6,299,800 B1 | 10/2001 | Viswanathan | |
| 6,337,380 B1 * | 1/2002 | Sasaki | C08F 212/14 430/522 |
| 6,523,699 B1 * | 2/2003 | Akita et al. | 210/490 |
| 6,552,107 B1 | 4/2003 | Paul et al. | |
| 6,764,617 B1 | 7/2004 | Viswanathan et al. | |
| 6,787,295 B1 * | 9/2004 | Nakanishi | G03C 1/005 430/512 |
| 7,449,112 B2 * | 11/2008 | Lee | B01D 67/009 210/490 |
| 2009/0314995 A1 | 12/2009 | Jayakannan et al. | |
| 2010/0187509 A1 * | 7/2010 | Yeisley | C08F 228/02 257/40 |

FOREIGN PATENT DOCUMENTS

| | | |
|---|---|---|
| KR | 10-2003-0038232 | 5/2003 |
| KR | 10-0843569 | 7/2008 |
| KR | 10-2009-0067847 | 6/2009 |

* cited by examiner

POLYVINYL COPOLYMER, DOPANT HAVING THE SAME, AND CONDUCTIVE POLYMER COMPOSITE HAVING THE DOPANT

CROSS-REFERENCE TO RELATED APPLICATIONS

This application is a continuation of International Application No. PCT/KR2012/003115 filed on Apr. 23, 2012, claiming priority based on Korean Patent Application No. 10-2011-0038577 filed on Apr. 25, 2011, the contents of all of which are incorporated herein by reference in their entirety.

TECHNICAL FIELD

The present disclosure relates to a polyvinyl-based copolymer including a hydroxyl group and one or more side-chain sulfonic acid groups, a dopant including the polyvinyl-based copolymer, a conductive polymer composite including the dopant and a conductive polymer, and a preparing method of the same.

BACKGROUND ART

A conductive plastic is a polymer which has attracted attention again since professors A. J. Heeger and A. G. MacDiarmid in the USA and professor H. Shirakawa in Japan were awarded the Novel Prize in chemistry in 2000. Since they firstly reported in 1977 that polyacetylene as a polymer can carry electricity through a doping process, lots of research on the conductive plastic has been carried out, which can be seen from the fact that the number of disclosed literatures has increased by more than double from 18,000 in 2000 to 42,000 in 2009.

Such conductive polymers are often called "the fourth generation plastic", which are characterized by performing an active role like organic semiconductors instead of a passive role like insulators or the like. Such conductive polymers can be used depending on their conductivity for antistatic materials with a conductivity of from $10^{-13}$ S/cm to $10^{-7}$ S/cm, static discharge materials with a conductivity of from $10^{-6}$ S/cm to $10^{-2}$ S/cm, and EMI shielding materials, battery electrodes, semiconductors, or solar cells with a conductivity of 1 S/cm or more. If their conductivity is improved, the conductive polymers can be developed into further high-tech applications including transparent electrodes and the like.

Main conductive polymers known so far include a polyaniline, a polypyrrole, a polythiophene, a poly(p-phenylene vinylene), a poly(p-phenylene), and a polyphenylene sulfide (PPS).

Polythiophenes have been commercialized and widely used as poly (3,4-ethylenedioxythiophene-)- (PEDOT) (EP Patent No. 339 340) having a substituent in a thiophene ring. A chemical structure of the polythiophene is as shown below:

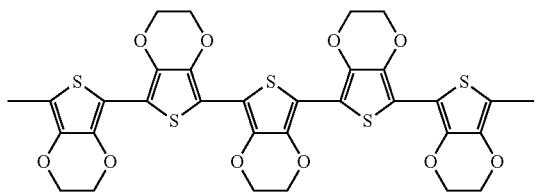

Polyanilines are an organic polymer having an alternating ring heteroatom backbone structure in which various substituents can be introduced to a benzene ring or a nitrogen atom, and can be classified depending on their oxidation state into a partially oxidized Emeraldine Base (EB) (y=0.5), a fully reduced Leucoemeraldine Base (LE) (y=1.0), and a fully oxidized Pernigraniline Base (PN) (y=0.0) as shown in the following structures.

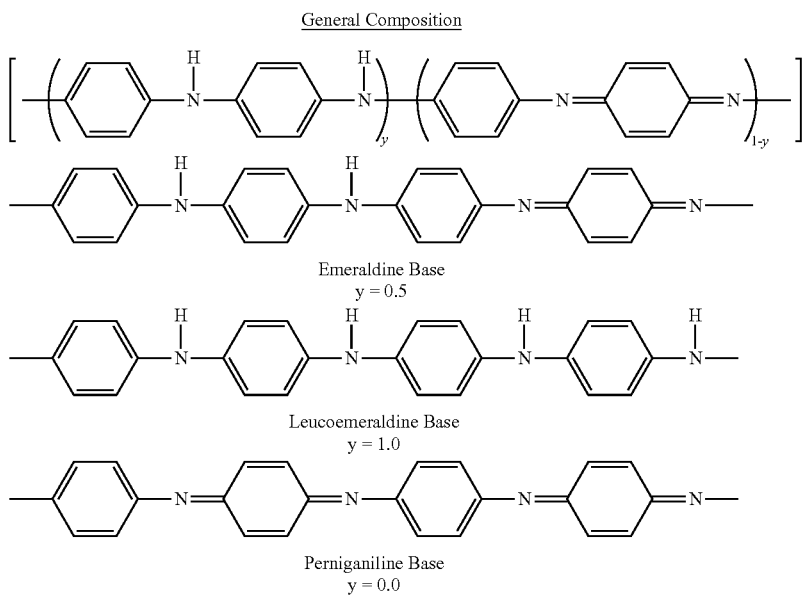

These conductive polymers can be doped and dedoped through an acid-base reaction in addition to an electric method. In particular, conductivity of a polyaniline can be adjusted by using such an acid-base reaction and thus has been widely used. However, a kind of an acid may highly affect not only conductivity but also heat-resistant and environment-resistant stability. The polyaniline has two nitrogen atom groups in the backbone, and pKa values of the groups (—NH$_2^+$—) and (—NH$^+$=) are 2.5 and 5.5, respectively. Therefore, a strong acid having a pKa <2.5 may donate protons to these two groups and can dope the polyaniline. An imine nitrogen atom of the latter can be fully or partially protonated in a protonic acid aqueous solution. In this case, it becomes Emeraldine Salts (ES) of which a doping level can be adjusted, and conductivity of the ES in the forms of powder and film is sharply increased from $10^{-8}$ S/cm to 1~1000 S/cm. Such a doping process is well understood through numerous studies, and it has been well known to be largely divided into primary doping and secondary doping using solvent, etc. According to a method for doping by changing a counter ion of a sulfonic acid dopant suggested by Cao et al. [Y, Smith P, Heeger A J. Synth Met 1993; 55-57: pp 3514] as the most noteworthy method, solubility of a conductive polymer composite in an organic solvent is increased and processability is increased. However, with a low molecular weight (intrinsic viscosity of from 0.8 dl/g to 1.2 dl/g), a polyaniline can be dissolved in 1-methyl-2-pyrrolidone (NMP), and emeraldine salts doped with 10-camphorsulfonic acid (ES/CSA) can be dissolved in meta-cresol but can become gel at room temperature. Further, even if a conductive polymer blend is manufactured by using a relatively macromolecular organic acid such as dodecylbenzensulfonic acid (DBSA), acrylamidomethylsulfonic acid (2-acrylamido-2-methyl-1-propanesulfonic acid, AMPSA), camphorsulfonic acid (CSA), there is still a problem with environment-resistance or heat-resistance. In particular, as for a polyaniline product in the form of a film, a decrease in conductivity caused by loss of a dopant in the air is an important issue.

Besides, a polymerization method in which surfactants (micelles) or stabilizers or dopants DEHEPSA (di-2-ethylhexylester of 1,2 benzene dicarboxylic-4-sulfonic acid; Kulszewicz-Bajer et al., Synthetic Metals, 101, 1999, pp. 713-714) as plasticizers are added, a dispersion polymerization method in which polyvinyl alcohol is used as a steric stabilizer [J. Stejskal et al, Polymer, 37, 1996, pp 367], and a method in which such elements are added to already-polymerized polyaniline to improve processability and stability have been disclosed. However, according to these methods, electrical conductivity of a conductive polymer composite is sharply decreased.

M. Jayakannan et al. (US Patent Application No. US2009/0314995) and Paul et al. (U.S. Pat. No. 6,552,107) describe a method of preparing a cardanol-based derivative to be used as a dopant. According to each of them, an azo sulfonic acid derivative and a 3-pentadecyl phenol derivative are main structures of dopants, and a hydroxyl group and an alkyl side chain are introduced thereto, and, thus, solubility is increased along with regeneration potential using a cashew nut shell as a natural substance. However, an azo group can be thermally denaturalized and an alkyl group as a side chain is not well defined and a double bond may exist. Thus, chemical and physical characteristics can be changed. Further, there is also disclosed a regenerable lignosulfonic acid-based dopant (U.S. Pat. Nos. 5,968,417, 6,299,800, 6,764,617, etc.). However, most of the above-described dopants have electrical conductivity, as a main characteristic, as low as $10^{-3}$ S/cm, and, thus, there are limits in effectively using it.

Further, lots of research on polymer dopants has been carried out. Polymers used in such research may be polymers containing, for example, polyacrylic acid, polysulfonic acid, cellulose sulfonic acid, polyamic acid, polymer phosphoric acid, —COCl, or —SO$_2$Cl.

Makowski H. S. [U.S. Pat. No. 3,870,841 (1975)] disclosed a method for preparing polystyrene sulfonic acid (PSS) from a polymer sulfonic acid derivative. PSS has been used in various uses such as insoluble polymer compounds, ion exchange resins, reverse osmosis, ultra filtering, plasticizers, and the like. As for a conductive polymer composite, PSS has been mainly used to prepare PEDOT. However, the PSS can act as a water-soluble polymer dispersion, and, thus, there are limits in applications. Further, since the PSS has a structure in which a sulfonic acid group is directly bonded to a benzene ring, if it is used as a dopant in a solid skeleton having a high molecular weight such as a polyaniline, mechanical properties of the conductive polymer composite can be weakened due to brittleness of polystyrene. Furthermore, a benzene ring of the polystyrene is stacked with a benzene ring of aniline, and in this case, the benzene ring of the polystyrene is changed depending on distribution of sulfonic acid groups introduced along polymer chains and non-uniformity between the chains may affect properties. Moreover, if a content of the sulfonic acid groups is increased, two sulfonic acid groups between molecules or in a molecule are cross-linked at a high temperature, so that sulfonation occurs between the benzene rings. Thus, the PSS is not appropriate as a dopant.

DISCLOSURE OF THE INVENTION

Problems to Be Solved by the Invention

In order to solve problems regarding an environment-resistance, a heat-resistance, plasticity, etc. of conventional dopants, the present disclosure provides a polyvinyl-based copolymer including a hydroxyl group and one or more side-chain sulfonic acid groups, a dopant including the polyvinyl-based copolymer, a conductive polymer composite including the dopant and a conductive polymer, and a preparing method of the same.

However, problems to be solved by the present disclosure are not limited to the above-described problems. Although not described herein, other problems to be solved by the present disclosure can be clearly understood by those skilled in the art from the following descriptions.

Means for Solving the Problems

In order to achieve the objective, in accordance with a first aspect of the present disclosure, there is provided a polyvinyl-based copolymer represented by the following Chemical Formula 1:

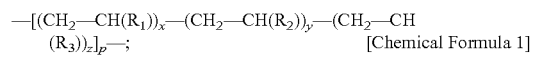
    [Chemical Formula 1]

wherein in Chemical Formula 1,
the three polymer blocks contained in the copolymer are independently selected, respectively,
R$_1$ represents —OH or —C$_6$H$_5$—OH,
when R$_1$ is —OH, R$_2$ and R$_3$ represent —O—R—SO$_3$H and —O—R—SO$_3^-$M$^+$, respectively; and when R$_1$ is —C$_6$H$_5$—OH, R$_2$ and R$_3$ represent —C$_6$H$_5$O—R—SO$_3$H and —C$_6$H$_5$O—R—SO$_3^-$M$^+$, respectively,
a substituent R of —O—R—SO$_3$H represents a C$_1$-C$_{20}$ alkyl group, a C$_1$-C$_{20}$ alkyl group substituted by a halogen, a C$_2$-C$_{20}$ alkenyl group, a C$_2$-C$_{20}$ alkenyl group substituted by a halogen, or —(CH$_2$CH$_2$O)$_n$—, M+ represents a metal cation, x, y, z, and n represent a non-negative integers, respectively, provided that each of y and n is independently at least 1, and p represents an integer of from 1 to 500,000.

In accordance with another aspect of the present disclosure, there is provided a preparing method of the polyvinyl-based copolymer.

In accordance with still another aspect of the present disclosure, there is provided a dopant including the polyvinyl-based copolymer.

In accordance with still another aspect of the present disclosure, there is provided a conductive polymer composite including the dopant and a conductive polymer and a preparing method of the conductive polymer composite.

Effect of the Invention

If a polyvinyl-based copolymer including a hydroxyl group and one or more side-chain sulfonic acid groups, such as a polyvinyl alcohol-based polymer or a polyvinyl phenol-based polymer is prepared to be used as a dopant, a molecular weight of a precursor polymer used to synthesize the polyvinyl-based copolymer, a substitution degree of the sulfonic acid, a length of a substituent, and a relative ratio of the sulfonic acids and its metallic salt can be regulated, and, thus, the dopant can react with a conductive polymer in various ways so as to prepare a conductive polymer composite having excellent compatibility, environment-resistance, conductivity, and a mechanical property. In particular, as compared with conventional low molecular dopants, a functional group acting as a dopant which is a flexible side chain is bonded to a polymer, and, thus, a dopant of the present disclosure has improved solubility and compatibility with respect to a conductive polymer and can provide a conductive polymer composite having an excellent mechanical property and electrical conductivity of about $10^3$ S/cm, and since the dopant is stable at a processing temperature of about 200° C. or more, it can be used to manufacture various conductive polymer composite products processed to be in the form of a film, a fiber, and the like or in a solution state or a molten state with improved processability and environment-resistance.

Further, a blend may be prepared to improve functions by mixing the above-described polymer composite with an additional second polymer. In this case, a dopant design may have different effects between the case of selecting a polymer by which the second polymer can be mixed with the polymer composite well and the case of selecting a polymer by which the second polymer is not mixed at all. If a polymer is blended with a molecular second polymer which is mixed well, dispersibility can be increased and structural uniformity can be maintained. If a polymer which is not mixed well is selected, even if only a conductive polymer composite sufficient to form a continuous phase is used, high conductivity can be obtained, and, thus, it can be expected to have double effect of high conductivity at a small amount.

BEST MODE FOR CARRYING OUT THE INVENTION

Figure 1:
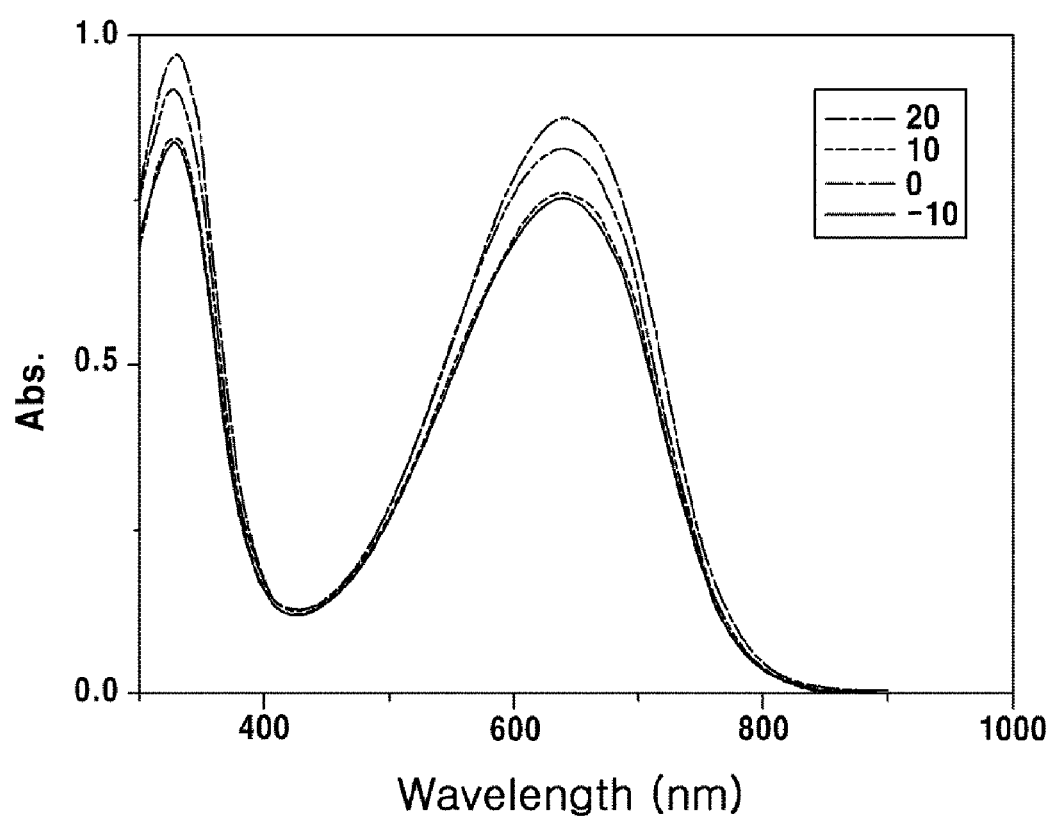
FIG. 1 illustrates UV-Vis spectra of a polyaniline (ES).

Hereinafter, illustrative embodiments and examples of the present disclosure will be described in detail with reference to the accompanying drawings so that the present disclosure may be readily implemented by those skilled in the art.

However, it is to be noted that the present disclosure is not limited to the illustrative embodiments and examples but can be embodied in various other ways. In drawings, parts irrelevant to the description are omitted for the simplicity of explanation, and like reference numerals denote like parts through the present disclosure.

Through the present disclosure, the term "comprise or include" and/or "comprising or including" used in the document means that one or more other components, steps, operation and/or existence or addition of elements are not excluded in addition to the described components, steps, operation and/or elements unless context dictates otherwise.

The term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the present disclosure, the term "step of" does not mean "step for".

Through the present disclosure, the term "alkyl", alone or as a part of another group, includes linear or branched radicals having from 1 to 22 carbon atoms, from 1 to 20 carbon atoms, from 1 to 10 carbon atoms, or from 1 to 6 carbon atoms if used alone or in combination with other terms such as "alkoxy", "arylalkyl", "haloalkyl", and "alkylamino" unless specified otherwise. 1 to 20 carbon atoms, 1 to 10 carbon atoms, or the alkyl group can be substituted by other substituents at certain carbon positions. By way of example, the alkyl group may include methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, and isomers thereof, but the present disclosure may not be limited thereto.

Through the present disclosure, the term "alkenyl", alone or as a part of another group, means a straight, branched, or cyclic hydrocarbon radical having from 2 to 12 carbon atoms, from 2 to 20 carbon atoms, from 2 to 10 carbon atoms, or from 2 to 6 carbon atoms, and one or more carbon-carbon double bond. The alkenyl group can be substituted at certain available contact points. By way of example, the alkenyl radical may include ethenyl, propenyl, alryl, butenyl and 4-methylbutenyl, pentenyl, hexenyl, isohexenyl, heptenyl, 4,4-dimethylpentenyl, octenyl, 2,2,4-trimethylpentenyl, nonenyl, decenyl, and isomers thereof, but the present disclosure may not be limited thereto. The terms "alkenyl" and "lower alkenyl" include radicals having "cis" and "trans" orientations or alternatively, "E" and "Z" orientations.

Through the present disclosure, the term "halogen" or "halo" means chlorine, bromine, fluorine, or iodine selected with respect to an independent substance.

Through the present disclosure, the term "metal" means alkali metal, alkali earth metal, or transition metal. The alkali metal includes Na, K, Rb, Cs, Fr, and the like.

Hereinafter, a polyvinyl-based copolymer, a preparing method of the same, a dopant including the copolymer, a conductive polymer composite including the dopant, and a preparing method of the same of the present disclosure will be explained in detail with reference to illustrative embodiments, examples, and accompanying drawings. However, the present disclosure may not be limited to the illustrative embodiments, examples, and drawings.

A polyvinyl-based copolymer dopant of the present disclosure is provided to solve a problem of a conventional dopant of a conductive polymer. The conventional dopant disappears by thermal diffusion or sublimation, and during a process, if time passes at a high temperature, conductivity is sharply decreased or compatibility with respect to a conductive polymer is low, so that electrical conductivity and a mechanical property cannot be improved. Thus, there is provided a copolymer dopant in which one or more side-chain sulfonic acids are substituted at polymer polyvinyl alcohol or a hydroxyl group of polyvinyl phenol and a conductive polymer composite prepared by doping a conductive polymer intrinsically conducting electricity with the copolymer dopant added at a predetermined ratio. At this time, by regulating a molecular weight of the polyvinyl alcohol or polyvinyl phenol as a precursor, a substitution degree of the sulfonic acids, a length of a substituent, and a relative ratio of the sulfonic acids and its metallic salt, the dopant is reacted with the conductive polymer in various ways, so that a conductive polymer composite having excellent compatibility, environment-resistance, conductivity can be provided.

In accordance with one aspect of the present disclosure, there is provided a polyvinyl-based copolymer having a structure represented by the following Chemical Formula 1:

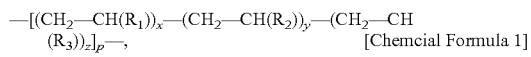
[Chemcial Formula 1]

wherein in Chemical Formula 1, the three polymer blocks contained in the copolymer are independently selected, respectively, $R_1$ represents —OH or —$C_6H_5$—OH, when $R_1$ is —OH, $R_2$ and $R_3$ represent —O—R—$SO_3H$ and —O—R—$SO_3^-M^+$, respectively; and when $R_1$ is —$C_6H_5$—OH, $R_2$ and $R_3$ represent —$C_6H_5O$—R—$SO_3H$ and —$C_6H_5O$—R—$SO_3^-M^+$, respectively;

a substituent R of —O—R—$SO_3H$ represents a $C_1$-$C_{20}$ alkyl group, a $C_1$-$C_{20}$ alkyl group substituted by a halogen, a $C_2$-$C_{20}$ alkenyl group, a $C_2$-$C_{20}$ alkenyl group substituted by a halogen, or —$(CH_2CH_2O)_n$;

$M^+$ represents a metal cation, x, y, z, and n represent a non-negative integers, respectively, provided that each of y and n is independently at least 1, and p represents an integer of from about 1 to about 500,000.

The —$C_6H_5$—OH as $R_1$ represents a phenyl ring having a —OH group, and the —OH group may be situated at an ortho, meta, or para position of the phenyl ring.

$M^+$ may include, for example alkali metals, but the present disclosure may not be limited thereto.

In an illustrative embodiment, n of —$(CH_2CH_2O)_n$ defined with respect to R may be an integer in a range of from about 1 to about 10, from about 1 to about 8, or from about 2 to about 6, but the present disclosure may not be limited thereto.

In an illustrative embodiment, the substituent R of —O—R—$SO_3H$ may be a $C_1$-$C_{12}$ alkyl group, a $C_1$-$C_{12}$ alkyl group substituted by a halogen, a $C_2$-$C_{12}$ alkenyl group, a $C_2$-$C_{12}$ alkenyl group substituted by a halogen, or —$(CH_2CH_2O)_n$ wherein n is from 1 to 10, but the present disclosure may not be limited thereto.

In an illustrative embodiment, p may be an integer of from about 1 to about 500,000, an integer of from about 3 to about 500,000, an integer of from about 3 to about 5,000, an integer of from about 3 to about 500, an integer of from about 3 to about 50, an integer of from about 3 to about 10, an integer of from about 5 to about 500,000, an integer of from about 5 to about 5,000, an integer of from about 5 to about 500, an integer of from about 5 to about 50, or an integer of from about 5 to about 30, but the present disclosure may not be limited thereto.

In Chemical Formula 1, a pH of the polyvinyl-based copolymer may vary depending on a relative ratio of x and y, and the polyvinyl-based copolymer may be microphase-separated and form a domain structure depending on a ratio of y and z, and, thus, regulating these factors may be very important in a function of the polyvinyl-based copolymer as a dopant and a surfactant, and regulation of properties.

By way of example, in Chemical Formula 1, when x, y, and z are expressed in a relative molar ratio, if y is about 5% or more, desirably about 12% or more, and more desirably about 18 or more, a proton can be given to a conductive polymer and a doping process can be performed well. If a value of x of the polyvinyl-based copolymer used as a dopant is regulated, when a second functional organic acid, such as CSa or DBSA, is mixed and used as a low molecular auxiliary dopant, doping efficiency can be increased and a heat-resistance and an environment-resistance can be regulated through molecular recognition. If a relative value of z is about 13% or more, nano-sized ionomer microphase is formed regardless of a kind of a metal ion and cross-liking may occur. In this case, by using a cross-linking degree, main properties such as solubility, processability, and a mechanical property can be controlled.

In an illustrative embodiment, the polyvinyl-based copolymer may include a polyvinyl alcohol sulfonic acid-based polymer or a polyvinyl phenol sulfonic acid-based polymer, but the present disclosure may not be limited thereto.

In an illustrative embodiment, the $C_1$-$C_{20}$ alkyl group substituted by a halogen may be a fluoro-$C_1$-$C_{20}$ alkyl group, and the $C_2$-$C_{20}$ alkenyl group substituted by a halogen may be a fluoro-$C_2$-$C_{20}$ alkenyl group, but the present disclosure may not be limited thereto.

In an illustrative embodiment, R of —O—R—$SO_3H$ may be $C_1$-$C_{12}$ alkyl, $C_2$-$C_{12}$ alkenyl, halo-$C_1$-$C_{12}$ alkyl, halo-$C_2$-$C_{12}$ alkenyl, or —$(CH_2CH_2O)_n$, but the present disclosure may not be limited thereto.

In an illustrative embodiment, R of —O—R—$SO_3H$ may be an alkyl group having from about 1 to about 20 carbon atoms, an alkyl group having from about 1 to about 16 carbon atoms, an alkyl group having from about 1 to about 12 carbon atoms, an alkyl group having from about 1 to about 10 carbon atoms, or an alkyl group having from about 1 to about 8 carbon atoms, but the present disclosure may not be limited thereto. By way of example, R of —O—R—$SO_3H$ may be methyl, ethyl, propyl, butyl, pentyl, hexyl, heptyl, octyl, nonyl, or decyl, or isomers thereof, but the present disclosure may not be limited thereto.

In accordance with another aspect of the present disclosure, there is provided a method for preparing the copolymer, the method including: preparing a polymer precursor solution by dissolving a precursor selected from a polyvinyl alcohol-based polymer or a polyvinyl phenol-based polymer in a solvent; and reacting the polymer precursor solution with a sultone-based compound or alkyl, alkenyl, ethyleneoxy sulfonic acid salt, or its metallic salt having a halogen at its end, but the present disclosure may not be limited thereto.

In an illustrative embodiment, the polyvinyl alcohol-based polymer and the polyvinyl phenol-based polymer may have a molecular weight in a range of from about 1,000 to about 1,000,000, but the present disclosure may not be limited thereto.

In an illustrative embodiment, the solvent may include a member selected from DMF, water, and NMP, but the present disclosure may not be limited thereto.

In an illustrative embodiment, the sultone-based compound may be sultone including an alkyl group having from 1 to 20 carbon atoms, but the present disclosure may not be limited thereto. By way of example, the sultone-based compound may be sultone including an alkyl group having from 1 to 20 carbon atoms, an alkyl group having from 1 to 16 carbon atoms, an alkyl group having from 1 to 12 carbon atoms, an alkyl group having from 1 to 10 carbon atoms, or an alkyl group having from 1 to 8 carbon atoms, but the present disclosure may not be limited thereto. By way of example, the sultone-based compound may include methane sultone, ethane sultone, propane sultone, butane sultone, pentane sultone, hexane sultone, heptane sultone, octane sultone, nonane sultone, or decane sultone, but may not be limited thereto.

If a length of the substituent R is greater than a persistence length, the copolymer becomes a hyperbranched polymer. In this case, the sulfonic acid group can act completely independently of a skeleton polymer, and, thus, doping efficiency can be further increased. Such polymer compounds can be prepared by reacting R substituted by a halogen at an end of an alkyl chain such as dibromoalkane with a hydroxyl group of the precursor polymer. If a length of the hyperbranched polymer is too long, a weight fraction of the dopant may become too high as compared with a conductive polymer and side chain crystallization may occur. Thus, there are limits in selecting a length. R may include, for example from about 6 to about 18 carbon atoms, but may not be limited thereto.

In accordance with still another aspect of the present disclosure, there is provided a dopant including the polyvinyl-based copolymer in accordance with the present disclosure.

In accordance with still another aspect of the present disclosure, there is provided a conductive polymer composite including the dopant in accordance with the present disclosure and a conductive polymer.

In an illustrative embodiment, the conductive polymer may include a member selected from the group consisting of a polyaniline, a polythiophene, a polypyrrole, a polyparaphenylene vinylene, a polyazine, a poly-p-phenylene sulfide, a polyfurane, a polyacetylene, a polyselenophene, and combinations thereof which may have a substituent. By way of example, the conductive polymer may include a member selected from the group consisting of a polyaniline, a polypyrrole, a polythiophene, and combinations thereof which may have a substituent, but the present disclosure may not be limited thereto. By way of example, if a polyaniline is used as the conductive polymer, when the polyvinyl-based copolymer used as the dopant of the present disclosure is mixed with the polyaniline by regulating a molar ratio value y in Chemical Formula 1 so as to correspond to 50% of the molar amount of a repeating structure of the polyaniline, a complete doping can be performed and the highest electrical conductivity can be expected theoretically. If necessary, depending on a doping process, 55% to 60% doping corresponding to 5% to 10% over doping can be performed.

In an illustrative embodiment, the conductive polymer may include an emeraldine salt (ES) of a polyaniline, but the present disclosure may not be limited thereto.

In an illustrative embodiment, the conductive polymer may include a polymer blend obtained by mixing an emeraldine salt (ES) of a polyaniline with a second polymer, but the present disclosure may not be limited thereto.

In an illustrative embodiment, the second polymer may include a member selected from the group consisting of a polyethylene, a polypropylene, a polyester, a polyamide, a polyether, a polycarbonate, a polyvinyl acetate, a polyvinylidene fluoride, a polymethylmetacrylate, a polystyrene, a polyvinylchloride, a polyurethane, a polysulfone, a polyethersulfone, a polyether ether ketone (PEEK), a polyimide, a epoxy resin, a polyacrylonitrile, a polyphosphazene, a nitrile butadiene rubber (NBR), a polysiloxane, and combinations thereof, but the present disclosure may not be limited thereto.

In an illustrative embodiment, the conductive polymer composite may have electrical conductivity in a range of from about $10^{-9}$ S/cm to about $10^3$ S/cm, but the present disclosure may not be limited thereto.

In an illustrative embodiment, the conductive polymer composite may further include a functional organic acid as a low molecular auxiliary dopant, and the functional organic acid may be selected from the group consisting of camphorsulfonic acid (CSA), dodecylbenzene sulfonic acid (DBSA), acrylamidomethyl sulfonic acid (AMPSA), p-toluene sulfonic acid (PTSA), and combinations thereof, but the present disclosure may not be limited thereto.

In an illustrative embodiment, the conductive polymer may be selected from the forms of a film, fiber, particles, or a solution, but may not be limited thereto.

In accordance with an aspect of the present disclosure, there is provide a method for preparing a conductive polymer composite, the method including: doping a conductive polymer with the dopant added thereto, but the present disclosure may not be limited thereto.

In an illustrative embodiment, the conductive polymer may include a member selected from the group consisting of a polyaniline, a polythiophene, a polypyrrole, a polyparaphenylene vinylene, a polyazine, a poly-p-phenylene sulfide, a polyfurane, a polyacetylene, a polyselenophene, and combinations thereof which may have substituents, and desirably may include a member selected from the group consisting of a polyaniline, a polypyrrole, a polythiophene, and combinations thereof which may have a substituent, but the present disclosure may not be limited thereto. By way of example, if a polyaniline is used as the conductive polymer, when the copolymer used as the dopant of the present disclosure is mixed with the polyaniline by regulating a molar ratio value y of the copolymer so as to correspond to 50% of the molar amount of a repeating structure of the polyaniline, a complete doping can be performed and the highest electrical conductivity can be expected theoretically. Actually, depending on a doping process, 5% to 10% overdoping can be performed.

In an illustrative embodiment, the conductive polymer may include an emeraldine salt (ES) of a polyaniline, but the present disclosure may not be limited thereto.

To be specific, when the doping process is performed by adding the dopant to the conductive polymer, a dopant may be dissolved in a solvent and reacted with the conducive polymer in the form of a particle or a solution, or an acid dopant may be added and reacted during a polymerization reaction occurring in an acid solution, and a plastic processing method may be used in a molten state, but the present disclosure may not be limited thereto.

In the doping process using the dopant, polyanilines, polypyrroles, and polythiophenes in the form of a emeraldine base can be dissolved in various organic solvents and acid solutions, and, thus, they can be used in a solution state. As for the conductive polymer in the form of a solid such as a particle, a fiber, a nanotube, and the like, a precipitation method or a conventional plastic processing method can be applied in a dispersed and molten state at a high temperature. The organic solvent used for the doping process in a solution state may include metacresol, DMSO (dimethylsulfoxide), DMF (dimethylforamide), NMP (N-methylpyrrolidinone), DMAc (dimethylacetamide), propylenecarbonate, THF, dioxane, or xylene, but the present disclosure may not be limited thereto. As for the doping process in an acid solution, a solvent may include 80% acetic acid, 60 to 99% formic acid, dichloroacetic acid, or trifluoroacetic acid, but the present disclosure may not be limited thereto. Besides, solvents such as isopropyl alcohol, butoxyethanol, octanol, chloroform, methylehtylketone, decalin, and xylene may be used, but the present disclosure may not be limited thereto.

In an illustrative embodiment, the conductive polymer may include a polymer blend obtained by mixing an emeraldine salt (ES) of a polyaniline with a second polymer, and the second polymer may include a member selected from the group consisting of a polyethylene, a polypropylene, a polyester, a polyamide, a polyether, a polycarbonate, a polyvinyl acetate, a polyvinylidene fluoride, a polymethylmetacrylate, a polystyrene, a polyvinylchloride, a polyurethane, a polysulfone, a polyethersulfone, a polyether ether ketone (PEEK), a polyimide, a epoxy resin, a polyacrylonitrile, a polyphosphazene, a nitrile butadiene rubber (NBR), a polysiloxane, and combinations thereof, but the present disclosure may not be limited thereto.

To be specific, when the polymer blend obtained by mixing the emeraldine salt (ES) of the polyaniline with the second polymer is used, a dopant design may have different effects between the case of selecting a polymer, as the second polymer, which can be mixed with the ES well and the case of selecting a polymer which is not mixed at all. If the second polymer is blended with a molecular polymer which is mixed well, dispersibility can be increased and structural uniformity can be maintained. If a polymer which is not mixed well is selected, even if only the ES sufficient to form a continuous phase in the ES/second polymer blend and exceed a percolation limit is used, high conductivity can be obtained, and, thus, it can be expected to have double effect of high conductivity at a small amount of the ES.

In an illustrative embodiment, the dopant may further includes a functional organic acid as a low molecular auxiliary dopant, and the functional organic acid may include a member selected from camphorsulfonic acid (CSA), dodecylbenzene sulfonic acid (DBSA), acrylamidomethyl sulfonic acid (AMPSA), and p-toluene sulfonic acid (PTSA), but the present disclosure may not be limited thereto. If the functional organic acid as an auxiliary dopant is mixed and used with the dopant of the present disclosure, main properties such as solubility, workability, and a mechanical property can be controlled more effectively.

In an illustrative embodiment, the conductive polymer may be selected from the forms of a film, fiber, particles, and a solution, but the present disclosure may not be limited thereto.

Hereinafter, the present disclosure will be explained in more detail with reference to examples, but the present disclosure may not be limited thereto.

MODE FOR CARRYING OUT THE INVENTION

As solvents used in the present example, HCl, $NH_4OH$ and $H_2SO_4$, and THF were reagents typically used, NaH, $NaHCO_3$, and potassium tert butoxide were reagent purchased, and chloroform was an extra pure reagent used as produced by Aldrich. As reagents used in a reaction, aniline, ammonium persulfate), p-toluene sulfonic chloride, and (1S)-(+)-10-camphorsulfonic acid (HCSA) were extra pure reagents used as produced by Aldrich.

An IR instrument used for confirming a chemical structure of a compound was NICOLET system 800 and a UV instrument was Jasco V-570. For measuring a thickness, Tencor P-10 super surface profiler was used, and for manufacturing a spin coating film, a spin coater produced by HEADWAY RESEARCH Inc. was used.

For measuring viscosity of a polymer, an Ubbelohde viscometer produced by Cannon Inc. was used and viscosity was measured at 30° C. For measuring electrical conductivity of a polymer film, a Source-Measure Units Model 237 produced by Keithley Instruments was used. TGA and DSC used for thermal analysis were TA TGAQ50 and DSCQ10, respectively. For particle size analysis, FPAR-1000 produced by Photal. For elementary analysis, Flash EA1112 produced by CE Instruments was used.

A mechanical property of a film sample was measured by using UTM 5900 produced by Instron, and an impact test was carried out by using a Charpy impact tester with intensity appropriate to the 2 mm×1 mm×10 mm sample.

Example 1

Synthesis of Polyvinyl Alcohol Sulfonic Acid Derivative (Sulfopropyl Poly(Vinyl)Alcohol (SuPPVA))(Molar Ratio of PVA:PSul=1:2)

A substitution ratio could be changed depending on a molar ratio of polyvinyl alcohol (PVA) to propanesultone (PSul), and a polyvinyl alcohol sulfonic acid derivative was prepared at a molar ratio of PVA:PSul of 1:2.

PVA (6.6 g) was dissolved in 200 mL of a solvent DMSO in a three-neck flask at 85° C., and then, 6.6 g of $K_2CO_3$ and 11.67 g of PSul were added thereto. After continuous stirring for 16 hours, the mixture was washed with a sufficient amount of ethanol. A produced sulfonic acid salt was filtered and dialyzed with distilled water, and then, a sulfonic acid was obtained by using an ion exchange resin. The obtained sulfonic acid was freeze-dried, and a polyvinyl alcohol sulfonic acid derivative was obtained finally. A sulfonic acid substitution ratio calculated by ICP analysis on K and S was 0.49. The substitution ratio means a ratio of substitution of OH groups of the polyvinyl alcohol by sulfonic acids.

Example 2

Synthesis of Polyvinyl Alcohol Sulfonic Acid Derivative (Sulfopropyl Poly(Vinyl)Alcohol (SuPPVA))(Molar Ratio of PVA:PSul=1:1)

A sulfonic acid derivative having a sulfonic acid substitution ratio of 0.31 was obtained by performing the same manner as Example 1 except that 3.3 g of $K_2CO_3$ and 5.8 g of PSul were added in the same manner as Example 1.

Example 3

Synthesis of Polyvinyl Phenol (PVP) Sulfonic Acid Derivative (Sulfobuthyl Poly(Vinyl) Phenol (SuBPVP))

PVP (4.4 g) was dissolved in 125 mL of a solvent DMSO in a three-neck flask at 85° C., and then, 2.2 g of $K_2CO_3$ and 4.11 g of butane sultone (BSul) were added thereto. After continuous stirring for 24 hours, the mixture was washed with a sufficient amount of ethanol. A produced sulfonic acid salt was filtered and dialyzed with distilled water, and then, a sulfonic acid was obtained by using an ion exchange resin. The obtained sulfonic acid was freeze-dried, and a polyvinyl phenol sulfonic acid derivative was obtained finally. A sulfonic acid substitution ratio calculated by analysis on K and S was 0.43.

Example 4

Synthesis of Polyvinyl Alcohol Sulfonic Acid Derivative and Its Metallic Salt

The SuPPVA (1.6 g) of Example 1 was dissolved in 200 mL of THF, and then, 1.0 g of KOH was added thereto and stirred for 3 hours at room temperature. After a precipitate was filtered, it was recrystallized. As a result, a sulfonic acid and its metallic salt (SUPPVAM) were obtained.

Example 5

Synthesis of Polyvinyl Phenol (PVP) Sulfonic Acid Derivative and Its Metallic Salt The SuBPVP (2.4 g) of Example 3 was dissolved in 200 mL of THF, and then, 1.3 g of KOH was added thereto and stirred for 3 hours at room temperature. After a precipitate was filtered, it was recrystallized. As a result, a sulfonic acid and its metallic salt were obtained.

Preparation Example 1

Synthesis of Polyaniline (PANi, EB)

Emeraldine base was synthesized for preparing a conductive polymer polyaniline composite. After a cooling circulation device was installed in a 1000 mL double jacket reactor, a reaction temperature of the reactor was set to 20° C. Then, 800 mL of 4 N HCl and 20.0 g of aniline were put into the reactor and dissolved for from 30 minutes to 35 minutes, a solution in which 11.44 g of ammonium persulfate was dissolved in 200 mL of 4 M HCl was titrated into the reactor in which the aniline was dispersed by a titrator for 25 minutes, and a polymerization reaction was carried out until the reaction solution was changed from blue to dark blue. After the polymerization reaction was completed, the reaction solution was filtered with a 2 μm filter paper and a Buchner filter and washed with distilled water and methanol, and a precipitate was obtained. Then, it was put into 800 mL of 0.1 M $NH_4OH$ and dedoped with stirring for 24 hours. After the stirring, it was filtered and dried in a vacuum oven fixed at 50° C. for 48 hours, and black polyaniline emeraldine base (EB) was obtained.

Experimental Example 1

Measurement of Viscosity (I.V.) of Polyaniline Emeraldine Base (EB)

In order to measure viscosity of the polymer synthesized in Example 2, 10 mg of polyaniline (EB) was dissolved in 10 mL of a concentrated sulfuric acid for about hours so as to prepare a polymer standard solution. Viscosity (I.V.) of the prepared polymer standard solution and the sample solution was measured at 30° C. by using an Ubbelohde viscometer.

Before the viscosity of the polymer solution was measured, viscosity of the concentrated sulfuric acid was first measured at 30° C. so as to be used as a reference value for viscosity measurement. After the polymer solution and the concentrated sulfuric acid as a reference solvent were immersed in a thermostat for about 1 hour for stabilizing a measurement temperature, the viscosity was measured.

$$\eta_{inh} = \frac{\ln(\eta/\eta_s)}{c}$$

$\eta_{inh}$: Initial viscosity η: Viscosity of solution
$\eta n_s$: Viscosity of solvent c: Concentration.

From the solution prepared according to the above-described process, a part insoluble in the solution was removed by using a syringe filter and a syringe. A glass plate (2.5 cm×2.5 cm×0.1 cm) was immersed in aqua regia for 4 hours or more and then taken out to wash a surface thereof with secondary distilled water and ethanol before use. About 3 mL of the filtered solution was dropped onto the glass plate on a hot plate set to from 40° C. to 50° C. and dried for 48 hours or more so as to manufacture a film.

Experimental Example 2

Measurement of Electrical Conductivity

Resistance of a sample is relevant to a length and a cross-sectional area of the sample, and when DC current and voltage is applied, the resistance has a relationship with a volume of DC resistivity as follows.

$$R=\rho L/A$$

Herein, ρ is resistivity in ohms-cm. L is a length in cm, and A is the sample' cross-sectional area in $cm^2$.

Every material has its own resistivity. DC resistivity is the reciprocal of DC conductivity and measured in $ohms^{-1}$ $cm^{-1}$ and S/cm (siemans per cm) according to the IUPAC system. This conductivity is the same in the same material prepared in the same condition and can be used to identify the material from other materials.

As for a metallic material having conductivity, an electrical contact resistance between a probe and a sample may be greater than a resistance of the sample itself. For this reason, a two-probe method has not been widely used. A four-probe method can solve such a problem.

Example 6

Preparation of Doped Polyaniline Film (1) Preparation of Polyaniline (ES) Solution Doped with SuPPVA Before a polyaniline film was manufactured, a polyaniline (ES) solution doped with SuPPVA was prepared as follows. In order to dope polyaniline with the SuPPVA prepared in Example 1, a molar ratio of an EB tetramer unit to a sulfonic acid group in the SuPPVA was set to 1:2 and a total content of these polymers was set to 1.5 wt. % with respect to m-cresol. The polyaniline (EB) and the SuPPVA were uniformly grounded and mixed in a solid state. The mixture powder was put into m-cresol and dissolved at a speed of 24,000 rpm for 10 minutes by using a homogenizer.

(2) Preparation of ES Solution Doped by Conventional Method for Comparison

An ES solution was prepared in the same manner as the above-described ES preparation method with CSA [(1S)-(+)-10-camphorsulfuric acid, 99%] soluble in an organic solvent instead of the SuPPVA.

(3) Preparation of Polyaniline Film

From the solution prepared according to the above-described process, a part insoluble in the solution was removed by using a syringe filter and a syringe. A glass plate (2.5 cm×2.5 cm×0.1 cm) was immersed in aqua regia for 4 hours or more and then taken out to wash a surface thereof with secondary distilled water and ethanol before use. About 3 mL of the filtered solution was dropped onto the glass plate on a hot plate set to from 40° C. to 50° C. and dried for 48 hours or more so as to manufacture a film.

Measurement of Conductivity

The conductivity of the film prepared by the above-descried process was measured by using a four-point probe method in order to remove contact resistance between a gold wire electrode and a sample. The film and the gold wire were brought into contact with each other by using carbon paste. A thickness of the film was measured by using a micrometer produced by Mitutoyo.

A current and a voltage were measured by using a Source-Measure Units Model 237 produced by Keithley Instruments. According to the measurement method, when a constant source current (I, DC) was applied to two outside terminals, a voltage difference (V) caused by the application was measured at the two inside terminals. At the time of measurement, by using a range in which was linearly increased at a source current double of 100 µA, 1 mA, or 10 mA as a reference, a voltage difference measured at a source current of 200 µA, 2 mA, or 20 mA was compared with the reference.

Electrical conductivity was calculated by using the following formula:

$$\sigma = \frac{(l)(I)}{(d \times t)(V)}$$

σ: Electrical conductivity (S cm$^{-1}$, reciprocal of Ω cm)

I: Constant source current (DC) (A) applied to sample

V: Voltage (V) measured when constant source current is applied t: Film thickness (cm)

l: Length between electrodes d: Length of film in contact with terminal (Film width).

By way of example, electrical conductivity of a free-standing film was measured by the four-point probe method as follows.

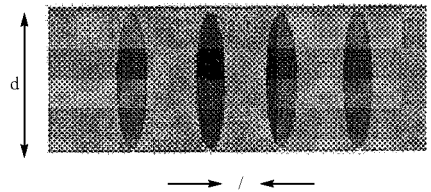

When electrical conductivity of a very thin sample such as a semiconductor wafer or a conductive coating was measured, the measurement was carried out by using a collinear four-point probe method.

A collinear four-point probe was purchased from Jandel Engineering Ltd. and used. This probe was connected to the Source-Measure Units Model 237 produced by Keithley Instruments. The measurement was carried out in the same manner as the four-probe method, and a calculation formula was as follows.

$$\sigma(S/cm) = \left(\frac{\ln 2}{\pi}\right)\left(\frac{I}{V \times t}\right)$$

σ: Electrical conductivity (S cm$^{-1}$, reciprocal of Ω cm)

I: Constant source current (DC) (A) applied to sample

V: Voltage (V) measured when constant source current is applied t: Film thickness (cm)

$\frac{\ln 2}{\pi}$:

Electric field factor (constant) (1/C) generating at four probes.

Example 7

Preparation of Polymer Blend EB/PVC/PVA

The SuPPVA (1.7 g) and 2.0 g of the PVC of Example 1 were dissolved in 200 mL of THF and mixed together with stirring for 24 hours. After the solvent was evaporated, 7 parts by weight of the SuPPVA/PVC was added to a solution in which 3 parts by weight of EB was dissolved in 200 parts by weight of THF, and then stirred for 48 hours. By using this solution, a molecularly dissolved polymer blend EB/PVC/SuPPVA was prepared. A film was prepared by the method of Example 6 and conductivity thereof was measured. It was confirmed that the film was doped, and a measurement result of the conductivity was as shown in the following Table 1.

Example 8

Preparation of Polymer Blend EB/PVDF/SuPPVAP 70 parts by weight of PVDF particles and 30 parts by weight of the EB/SuPPVA of Example 6 were melted and blended. The EB/SuPPVP and the PVDF were first blended by a laboratory single screw blender at 80 to 250 rpm, at 170° C. to 220° C. within 5 minutes, and a sample was obtained and pressed between two slide glasses. Then, a temperature was maintained at 190° C. for 10 minutes, and the sample was cooled. Conductivity of this sheet-type sample was measured by the method of Example 6. It was confirmed that the film was doped, and a measurement result of the conductivity was as shown in the following Table 1.

Example 9

Preparation of Polymer Blend EB/PMMA/SuPPVA

PMMA particles in an amount of 70 parts by weight with respect to aniline were polymerized by the method of Example 6 so as to prepare a blend ES/PMMA. This blend was dedoped and then doped by using SuPPVA. This blend was stacked with 3 to 5 layers of a 10 to 30 micrometer thickness film prepared from a chloroform solution so as to press-fitted film by using a small hot press. Properties of its sample were measured, and a result of the measurement was as shown in the following Table 1.

TABLE 1

Property of ES using the developed dopant and general plastic blends

| Sample/Characteristic | EB, IV | Plastic parent material characteristic | Electrical Conductivity, S/cm | Elasticity, GPa | Impact Intensity | Remarks |
|---|---|---|---|---|---|---|
| SuPPVAM/PVC | 0.93 | PVC, LG LS080S | 34 +/− 3% | 1.6 | 13 | Film in good condition |
| SuBPVP/PVDE | 0.95 | PVDF, Kynar 740 | 17 +/− 3% | 0.9 | 19 | Film in good condition |
| SuPPVA/PMMA | 1.2 | PMMA, Daesan TF8 | 69 +/− 3% | 1.8 | 16 | Opaque film |

Example 10

UV-Vis-NIR Spectroscopic Analysis

Figure 2:
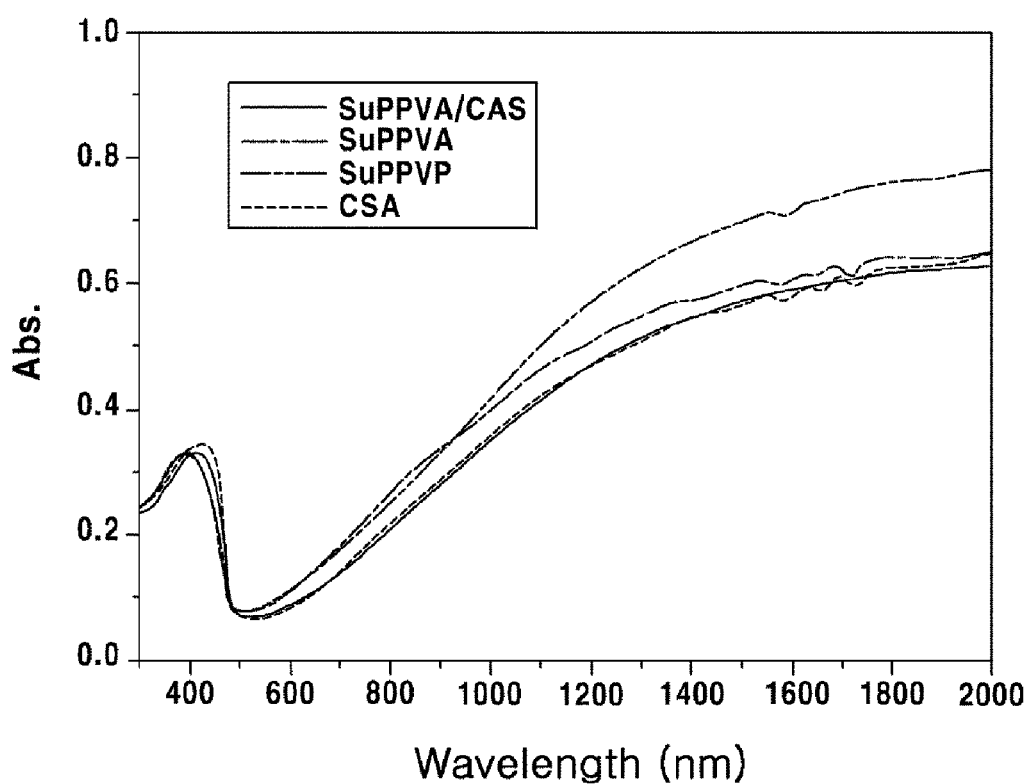
FIG. 2 illustrates UV-Vis spectra of ES doped with SUP-PVA+CSA (7:3), SuPPVA, SuBPPVP, and CSA, respectively.

After preparation of respective NMP solutions in which polyanilines (EB) obtained from Preparation Example 1 at various temperatures of 20° C., 10° C., 0° C., and −10° C. were dissolved, thin films each having a thickness of 0.1 μm to 0.2 μm prepared by spin-coating the solutions on a quartz plate were analyzed by UV-Vis-NIR spectroscopy. As can be seen from FIG. 1, absorption of π-π* transition was shown around 330 nm, and an absorption peak of exciton transition was shown between 640 nm and 650 nm, and, thus, an emeraldine base was confirmed. Doping of ES obtained by doping polyaniline EB synthesized at 20° C. by the method of Example 6 with each of SUPPVA+CSA (7:3), SuPPVA, SuBPPVP, and CSA could be indirectly confirmed from UV data as shown in FIG. 2. For comparison, after preparation of a m-cresol solution in which polyaniline (ES) doped with CSA was dissolved, it was spin-coated in the same manner as the EB and a film was analyzed. All of them showed a wide peak, i.e. a polaron peak, and a peak of a free-carrier tail at 420 nm and near an IR region, and, thus, it could be confirmed that the ES was doped (FIG. 2).

Example 11

Measurement of Solubility

The following Table 2 shows a measurement result of solubility of polyaniline ES doped with a polymer dopant. To measure a solubility, 0.02 g of polyaniline EB was put into 10 mL of each solvent and doped with a dopant by stirring with the dopant for 24 hours at room temperature so as to form a polyaniline ES. Then, solubility of the polyaniline ES was observed.

TABLE 2

Solubility of ES doped with the polymer dopant

| | | SuBPVP | | | | | | SuPPVA | | | | | |
|---|---|---|---|---|---|---|---|---|---|---|---|---|---|
| Polymer | PANI | 10 wt. % | | 20 wt. % | | 30 wt. % | | 10 wt. % | | 20 wt. % | | 30 wt. % | |
| Solvent | EB ES | EB | ES | EB | ES | EB | ES | EB | ES | EB | ES | EB | ES |
| MEK | $^c$△ — | △ | — | △ | — | ○ | — | △ | — | ○ | — | ○ | — |
| DMF | $^a$⊚ — | ⊚ | — | ⊚ | — | ⊚ | — | ⊚ | — | ⊚ | — | ⊚ | — |
| NMP | ○ — | $^b$⊚ | — | ⊚ | — | ⊚ | — | ⊚ | — | ⊚ | — | ⊚ | — |
| CHCl$_3$ | $^d$X — | X | — | X | — | X | — | X | — | △ | — | △ | — |
| Benzyl alcohol | △ X | △ | X | △ | X | △ | X | △ | X | △ | X | △ | X |
| PC | △ △ | △ | △ | ○ | X | ⊚ | X | △ | X | ○ | X | ⊚ | X |
| MeOH | X X | X | △ | △ | ○ | ○ | ⊚ | X | △ | △ | ○ | ○ | ⊚ |
| Water | X X | X | X | X | X | X | ⊚ | X | X | X | △ | X | ⊚ |

$^a$⊚ - dissolved well,
$^b$○ - dissolved,
$^c$△ - slightly dissolved,
$^d$X - not dissolved

What is claimed is:

1. A polyvinyl-based polymer represented by the following Chemical Formula 1:

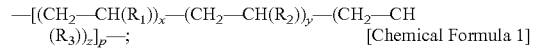
[Chemical Formula 1]

wherein in Chemical Formula 1,
the three polymer blocks contained in the polymer are independently selected, respectively,
$R_1$ represents —OH or —$C_6H_4$—OH,
when $R_1$ is —OH, $R_2$ and $R_3$ represent —O—R—$SO_3$H and —O—R—$SO_3$-$M^+$, respectively; and when $R_1$ is —$C_6H_4$—OH, $R_2$ and $R_3$ represent —$C_6H_4$O—R—$SO_3$H and —$C_6H_4$O—R—$SO_3$-$M^+$, respectively,
a substituent R of —O—R—$SO_3$H, —O—R—$SO_3$-$M^+$, —$C_6H_4$O—R—$SO_3$H, and —$C_6H_4$O—R—$SO_3$-$M^+$ represents a $C_1$-$C_{20}$ alkylene group, a $C_1$-$C_{20}$ alkylene group substituted by a halogen, a $C_2$-$C_{20}$ alkenylene group, a $C_2$-$C_{20}$ alkenylene group substituted by a halogen, or —($CH_2CH_2O$)$_n$—,
$M^+$ represents a metal cation;
x, y, z, and n represent non-negative integers, respectively, provided that each of x, y, z, and n is independently at least 1, and
p represents an integer of from 1 to 500,000.

2. The polyvinyl-based polymer of claim 1, wherein the $C_1$-$C_{20}$ alkylene group substituted by a halogen is a fluoro-$C_1$-$C_{20}$ alkylene group, and the $C_2$-$C_{20}$ alkenylene group substituted by a halogen is a fluoro-$C_2$-$C_{20}$ alkenylene group.

3. The polyvinyl-based polymer of claim 1, wherein the substituent R of —O—R—SO$_3$H, —O—R—SO$_3^-$M$^+$, —C$_6$H$_4$O—R—SO$_3$H, and —C$_6$H$_4$O—R—SO$_3^-$M$^+$ is a $C_1$-$C_{12}$ alkylene group, a $C_1$-$C_{12}$ alkylene group substituted by a halogen, a $C_2$-$C_{12}$ alkenylene group, a $C_2$-$C_{12}$ alkenylene group substituted by a halogen, or —(CH$_2$CH$_2$O)$_n$— wherein n is from 1 to 10.

4. The polyvinyl-based polymer of claim 1, wherein M$^+$ includes a cation of an alkali metal.

5. The polyvinyl-based polymer of claim 1, wherein y comprises at least 5% of a total of x, y and z.

6. The polyvinyl-based polymer of claim 1, wherein z comprises at least 13% of a total of x, y and z.

7. The polyvinyl-based polymer of claim 1, wherein y comprises at least 12% of a total of x, y and z.

8. A dopant comprising a polyvinyl-based polymer of claim 1.

9. A conductive polymer composite comprising a dopant of claim 8 and a conductive polymer.

10. The conductive polymer composite of claim 9, wherein the conductive polymer includes a member selected from the group consisting of a polyaniline, a polythiophene, a polypyrrole, a polyparaphenylene vinylene, a polyazine, a poly-p-phenylene sulfide, a polyfurane, a polyacetylene, a polyselenophene, and combinations thereof which may have a substituent.

11. The conductive polymer composite of claim 9, wherein the conductive polymer includes a member selected from the group consisting of a polyaniline, a polypyrrole, a polythiophene, and combinations thereof which may have a substituent.

12. The conductive polymer composite of claim 9, wherein the conductive polymer includes an emeraldine salt of a polyaniline.

13. The conductive polymer composite of claim 9, wherein the conductive polymer includes a polymer blend obtained by mixing an emeraldine salt of a polyaniline with a second polymer, the second polymer being different than the dopant.

14. The conductive polymer composite of claim 13, wherein the second polymer includes a member selected from the group consisting of a polyethylene, a polypropylene, a polyester, a polyamide, a polyether, a polycarbonate, a polyvinyl acetate, a polyvinylidene fluoride, a polymethylmetacrylate, a polystyrene, a polyvinylchloride, a polyurethane, a polysulfone, a polyethersulfone, a polyether ether ketone, a polyimide, a epoxy resin, a polyacrylonitrile, a polyphosphazene, a nitrile butadiene rubber, a polysiloxane, and combinations thereof.

15. The conductive polymer composite of claim 9, wherein the conductive polymer composite has electrical conductivity in a range of from $10^{-9}$ S/cm to $10^3$ S/cm.

16. The conductive polymer composite of claim 9, further comprising:
a functional organic acid as an auxiliary dopant.

17. The conductive polymer composite of claim 16, wherein the functional organic acid includes a member selected from the group consisting of camphorsulfonic acid, dodecylbenzene sulfonic acid, acrylamidomethyl sulfonic acid, p-toluene sulfonic acid, and combinations thereof.

18. The conductive polymer composite of claim 9, wherein the conductive polymer is in the form of a film, a fiber, a particle, or a liquid.

\* \* \* \* \*